United States Patent

Uno et al.

[15] 3,706,266
[45] Dec. 19, 1972

[54] CAMERA OPERATING WITH PREPARATORY AND SYNCHRONOUS LIGHT

[72] Inventors: Naoyuki Uno, Saitama-ken; Seijiro Tokutomi, Fujisawa, both of Japan

[73] Assignee: Asahi Kogaku Kogyo Kabushiki Kaisha, Tokyo-to, Japan

[22] Filed: May 26, 1971

[21] Appl. No.: 146,917

Related U.S. Application Data

[63] Continuation-in-part of Ser. No. 42,387, June 1, 1970.

[30] Foreign Application Priority Data

June 8, 1970 Japan.................................45/49278

[52] U.S. Cl..........................95/11 L, 95/11.5, 95/42
[51] Int. Cl. .................................................G03b 19/00
[58] Field of Search.....95/10 CT, 10 CE, 10 R, 11.5, 95/112, 42

[56] References Cited

UNITED STATES PATENTS 3,173,347  3/1965  Stimson et al. .......................95/10 C
3,545,354  12/1970  McCune, Jr. .........................95/11 L
3,601,022  8/1971  Langanu.............................95/42 X
3,610,122  10/1971  Biber ..................................95/11 L Primary Examiner—Samuel S. Matthews
Assistant Examiner—Richard A. Wintercorn
Attorney—Steinberg & Blake

[57] ABSTRACT

A single lens reflex camera having a light source energized first by preparatory controls to provide preparatory light and then by synchronous controls to provide synchronous light. The synchronous light is used during actual exposure while the preparatory light is used in the determination of the extent of actual exposure. Just prior to actual exposure a reflector is moved from a viewing position where it directs an image of the object to the viewfinder to an exposure position in which it is located during actual exposure. The preparatory controls for energizing the light source to provide preparatory light are actuated just prior to displacement of the mirror from its viewing to its exposure position, so that the determination of actual exposure with the preparatory light takes place immediately prior to the actual exposure.

11 Claims, 3 Drawing Figures

PATENTED DEC 19 1972
3,706,266
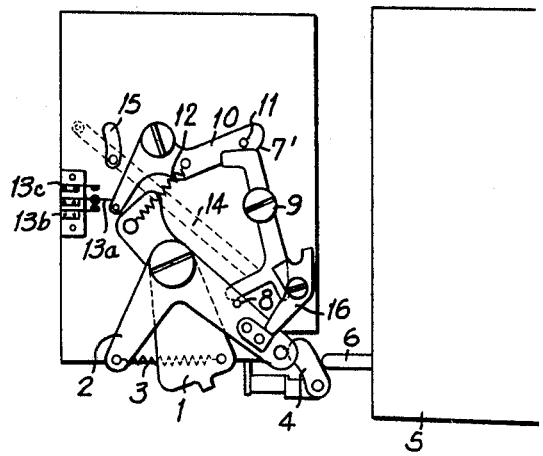
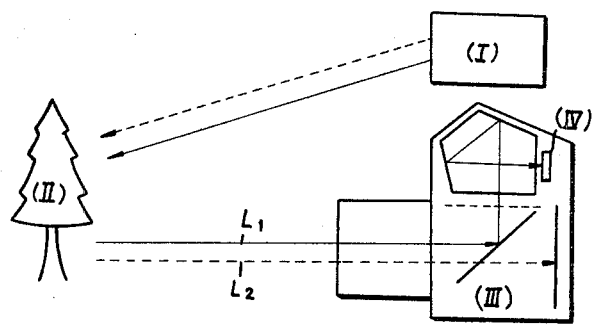
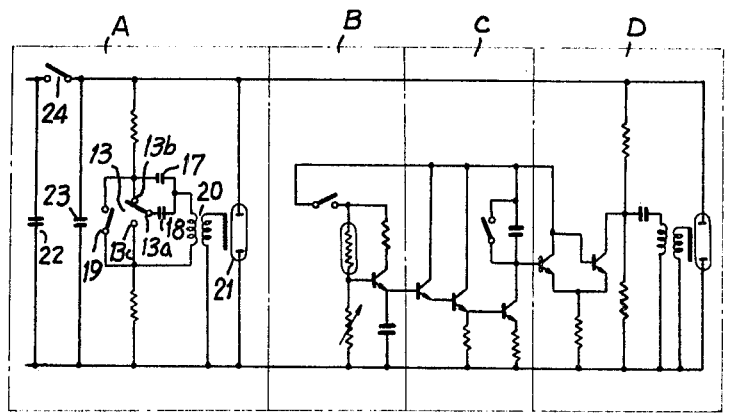
INVENTORS
NAOYUKI UNO
SEIJIRO TOKUTOMI
BY
Steinberg and Blake
ATTORNEYS

CAMERA OPERATING WITH PREPARATORY AND SYNCHRONOUS LIGHT

CROSS REFERENCE TO RELATED APPLICATION

This application is a continuation-in-part of copending application Ser. No. 42,387, filed June 1, 1970.

BACKGROUND OF THE INVENTION

The present invention relates to cameras.

In particular, the present invention relates to that type of camera where artificial light is emitted from a source such as a xenon discharge tube or a flash lamp. With such cameras it has already been proposed to provide prior to emission of light from the lamp synchronously with an exposure a preparatory light emission used for setting the camera to make a proper exposure with the synchronous light emission. The preparatory light emission provides light reflected back to the camera from the object which is to be photographed, and this preparatory light is then used to determine the camera operation during synchronous light emission so that a proper exposure will be made with the synchronous light. Thus, the light resulting from the preparatory light emission, prior to the synchronous light emission, is reflected back to the camera, entering through the objective thereof, and the light which is thus reflected during preparatory light emission from the object which is to be photographed can be detected by a photosensitive element situated in the path of light travelling through and beyond the objective from the object to be photographed, so that in accordance with the detection of the preparatory light a proper exposure can be made during the subsequent exposure with the synchronous light.

During use of a system of this type, a considerable inconvenience has been encountered in the requirement of operating with the preparatory light emission prior to actual exposure with the synchronous light. It has been found that there is a drop in the effective accuracy of the information which is stored as a result of the preparatory light emission. Thus, it has been found during practical use of a system of this type that variations often occur between the time when the preparatory light is emitted and reflected back to the camera and the time when the actual exposure is made, these variations often changing the conditions of exposure to such an extent that the actual exposure made with synchronous light as based upon the detection of the preparatory light is not as accurate might be desired.

SUMMARY OF THE INVENTION

It is accordingly a primary object of the present invention to provide a camera which will operate with preparatory and synchronous light, and which at the same time will avoid the above drawbacks.

In particular, it is an object of the present invention to provide a practical solution to the problem of utilizing the detection of the preparatory light in order to make proper exposures with the synchronous light.

In addition it is an object of the present invention to provide for use of an exposure system of this type in a single lens reflex camera.

Furthermore, it is an object of the present invention to provide a mechanism which will operate very reliably to achieve the preparatory light emission in such a way that it becomes possible to utilize the preparatory light in a highly reliable manner for determining proper exposures with the subsequent synchronous light.

According to the invention a single lens reflex camera is provided with an objective, a viewfinder, and a reflector means which has a viewing position situated behind the objective to receive light passing through the objective from an object which is to be photographed and to direct an image of the object to the viewfinder. This reflector means is movable between the latter viewing position and an exposure position situated beyond the path of light passing through the objective. A moving means coacts with the reflector means for moving the latter from the viewing position to the exposure position. A light-source means provides light to be reflected from the object back to the objective. A synchronous control means is operatively connected with the light-source means for energizing the latter to emit light during exposure while the reflector means is in its exposure position. A preparatory control means is also operatively connected with the light-source means to energize the latter to provide light prior to actual exposure. The moving means is operatively connected with the preparatory control means to actuate the latter to energize the light-source means during operation of the moving means just prior to displacement of the reflector means by the moving means from the viewing position to the exposure position thereof.

The moving means can be released for operation in response to actuation of a shutter-tripping button or plunger of the camera, and prior to actuation of the preparatory control means to energize the light-source means the structure released by operation of the shutter button can be used also to stop down the diaphragm to a preselected aperture, so that the diaphragm is in its stopped down condition when the preparatory light is reflected back to the camera to be detected therein. The moving means forms a drive for snapping a tiltable mirror, which forms the reflector means, upwardly from its viewing position to the exposure position situated beyond the path of light which travels through the objective, and the preparatory control means includes a switch located ahead of the mirror in the path of movement of the drive lever to be actuated thereby just prior to snapping up of the mirror to its exposure position, so that the preparatory light emission and detection takes place just prior to the actual exposure with the synchronous light emission.

BRIEF DESCRIPTION OF DRAWINGS

The invention is illustrated by way of example in the accompanying drawings which form part of this application and in which:

FIG. 1 is a schematic elevation showing a mechanism constructed according to the present invention and also showing schematically structure for stopping down a diaphragm of the camera;

FIG. 2 is a schematic representation of the arrangement of various components and how they operate; and FIG. 3 is a wiring diagram illustrating the circuitry which may be used with the structure of the invention.

DESCRIPTION OF A PREFERRED EMBODIMENT

Referring first to FIG. 2, there is schematically represented therein a light-source means I in the form of a xenon discharge tube or a flash lamp, serving to provide artificial light which travels to the object II which is to be photographed. From the latter object the light is reflected back to the camera III which is a single lens reflex camera having the objective, tiltable reflector, and viewfinder schematically represented in FIG. 2.

With this arrangement prior to actual exposure the light-source means I is energized to emit preparatory light $L_1$ which is reflected back to the camera from the object II. This preparatory light $L_1$ is then reflected by the tiltable mirror which forms the reflector means upwardly to the viewfinder, and in the path of viewfinder light there is a detector IV forming a photosensitive means which responds to the reflected preparatory light and which coacts with other structure for determining the actual exposure which is subsequently carried out.

On the basis of the information detected by the detector means IV, the synchronous light $L_2$ is regulated. This synchronous light $L_2$ is emitted from the light-source means I during actual exposure, and the synchronous light is represented by the dotted lines in FIG. 2 while the preparatory light is prepresented by the solid lines. Thus it will be noted that during actual exposure the reflector means is tilted upwardly to its exposure position situated beyond the path of light travelling through the objective, and thus the synchronous light $L_2$ reaches the film plane so as to expose film while the shutter is open. In accordance with the information which is detected by the detector means IV, the camera may be automatically operated to determine the exposure time during which the film will be exposed to the synchronous light $L_2$. Thus, with this type of system it is possible to obtain from the preliminary light, just prior to exposure, information which can subsequently be used during synchronous light emission for providing a proper exposure of the film. As was pointed out above, due to the time lag which is normally encountered between the preparatory light and synchronous light, the photographing conditions can change to such an extent that an improper exposure will be made on the basis of the preparatory light.

A preferred embodiment of the structure for regulating the extent of exposure is illustrated in FIG. 3. FIG. 3 illustrates a light-emitter section A for providing the sequence of preparatory and synchronous light emission. There is also a section B forming the unit which detects the reflected preparatory light and which responds thereto for introducing information into the circuitry so as to determine the extent of exposure with the synchronous light. A section C is provided in order to receive the information from the section B and store an electrical signal which corresponds to and is the equivalent of the light intensity of the preparatory light reflected from the object and detected by the section B. Finally, the circuitry includes a control section D which utilizes the information received by the section B and stored by the section C so as to control in accordance with this information the extent of emission of synchronous light by the light-source means I. The section D will automatically interrupt the emission of light during synchronous light emission according to the signal provided in response to the detection of the preparatory light, so that the amount of light which is emitted during synchronous light emission is automatically regulated to achieve a proper exposure according to the information derived by the reflection of the preparatory light from the object which is to be photographed.

The details of the circuitry sections B, C, D of FIG. 3 are fully described in the above application Ser. No. 42,387, filed June 1, 1970.

Referring to FIG. 1, there is illustrated therein a cocking or charging lever 1 which is turned to the position illustrated in FIG. 1 in connection with transportation of the film in the camera. As is well known when the film is transported after one exposure so as to situate the next film frame in a position to be exposed, the shutter is cocked and simultaneously the lever 1 is turned to the position illustrated in FIG. 1. The lever 1 is supported for swinging movement intermediate its ends by a pivot which may form the shank of a threaded element having the head which is illustrated in FIG. 1, this structure being mounted on a suitable support plate as shown. When the lever 1 is turned to the cocked or charged position shown in FIG. 1, the spring 3 is tensioned, this spring 3 forming part of a motion-transmitting means which includes the swingable power lever 2 whose turning axis coincides with that of the lever 1. The spring 3 of the motion-transmitting means 2, 3 is connected between the levers 1 and 2 as illustrated.

The power lever 2 is in the form of a bell crank and carries at its lower right end, as viewed in FIG. 1, a pin which engages a swingable lever 4 which forms an actuating means. This swingable lever 4 which forms an actuating means engages an elongated pin 6 which forms a diaphragm-adjusting means. When the lever 4 is swung in a clockwise direction, as viewed in FIG. 1, the pin 6 is displaced longitudinally toward the right, as viewed in FIG. 1, and a diaphragm which forms part of the objective 5, which is schematically illustrated in FIG. 1, is in this way stopped down to a preselected aperture.

The swingable power lever 2 carries a pin 8 which engages a lateral extension of an arm of a control lever 7 which is supported for swinging movement by a pivot 9 situated between the ends of the control lever 7. At its end distant from the power lever 2, the control lever 7 has an arcuate edge 7' which extends along a circle whose center is in the turning axis of the lever 7.

This edge 7' of the control lever 7 is engages by a pin 11 which is carried by a drive lever 10 which forms with a spring 12 a moving means for moving the reflector means 14 from its inclined viewing position upwardly to the exposure position. Thus, the reflector means 14 schematically represented in FIG. 1 is the tiltable mirror which receives the preparatory light $L_1$ to transmit an image to the viewfinder, and of course this preparatory light is detected by the photosensitive means IV. The drive lever 10 forms a moving means for moving the reflector means 14 from its inclined viewing position where it is situated in the path of light travelling through the objective to an exposure position where it is situated beyond the light travelling through the objective. The drive lever 10 of the moving means is supported for swinging movement about a pivot intermediate the ends of the drive lever 10, and the moving means includes a spring 12 extending between and connected with the cocking lever 1 and the drive lever 10, this spring 12 also being tensioned when the lever 1 is turned to the position shown in FIG. 1 in response to transportation of the film in the camera.

The drive lever 10 of the moving means 10-12 has a portion formed by its lower left end, as viewed in FIG. 1, and it is this portion of the drive lever 10 which moves into engagement with a pin 15 carried by the tiltable reflector means 14. The pin 15 extends from a frame which carries the mirror 14 through an arcuate slot formed in the supporting wall which is visible in FIG. 1, and of course this slot extends along a circle whose center is in the turning axis of the mirror 14, this turning axis being situated at the upper end of the mirror and extending perpendicularly with respect to the optical axis. Thus, the lower left portion of the drive lever 10 will be urged by the spring 12 into engagement with the pin 15 so as to snap the reflector means 14 from its viewing position to its exposure position.

However, situated in the path of movement of this portion of the drive lever 10, ahead of the pin 15, is a switch element 13a which is first engaged and displaced by the drive lever 10 just prior to swinging of the reflector means 14 from its viewing position to its exposure position. The switch element 13a forms a shiftable and flexible switch blade which normally engages a switch contact 13b and which is displaced by the moving means into engagement with a second switch contact 13c. This switch structure forms part of the preparatory control means for energizing the light-source means I so as to achieve the preparatory light $L_1$ just prior to the swinging of the mirror 14 up to its exposure position.

The parts are maintained in the position shown in FIG. 1 by a release lever 16 the bottom end of which engages a block or plate carried by the power lever 2. This release lever 16 is turned upon depression of the shutter-releasing plunger so that the lever 16 will be turned in a counterclockwise direction, as viewed in FIG. 1, to release the power lever 2 to the force of the spring 3.

Referring to FIG. 3, the light-emission control section A of the illustrated circuitry includes the switch 13 of the preparatory control means, this switch 13 having the contacts 13b and 13c and the flexible switch element 13a displaced by the moving means in the manner referred to above in connection with FIG. 1 and in a manner referred to below in greater detail. The switch 13 forms part of a charging circuit for a trigger capacitor 17 for synchronous light emission and a trigger capacitor 18 for preparatory light emission when the switch 13 is in its normal position with the blade 13a engaging the contact 13b as illustrated in FIG. 3. When the flexible blade 13a is displaced into engagement with the contact 13c, a discharge circuit is provided for the trigger capacitor 18 of the preparatory light control means. A synchronous light controlling switch 19 is closed simultaneously with release of the shutter to make an exposure, as by way of a suitable relay mechanism which coacts with the switch 19. The circuitry includes a trigger transformer 20 and the xenon flash discharge tube 21. Also, a capacitor 22 for synchronous light emission and a capacitor 23 for preparatory light emission are connected into the circuit with a switch 24 between these capacitors to control the light emission.

With the above-described structure and circuitry, the capacitors 22 and 23 as well as the capacitors 17 and 18 are all charged up to a predetermined level while the switch 24 is closed and the switch 13 is in its normal position with the flexible switch element 13a engaging the contact 13b. The power required for operating the circuitry and light-source means is delivered to the conductors illustrated at the upper and lower left ends of the circuit of FIG. 3. Assuming that the operator has properly framed the object to be photographed in the viewfinder and has set the diaphragm to the preselected aperture, the operator will actuate the shutter-releasing plunger or button so as to move the latter toward the location where it will trip the shutter so that an exposure will be made. The initial part of the movement of the shutter-operating element will swing the blocking lever 16 in a counterclockwise direction, as viewed in FIG. 1, so as to release the power lever 2 to the force of the tensioned spring 3. The result is that the actuating means formed by the lever 4 will be swung in a clockwise direction advancing the diaphragm-adjusting means formed the elongated pin 6 toward the right, as viewed in FIG. 1, so as to stop the diaphragm down to the preselected aperture.

As the power lever 2 continues to turn in a counterclockwise direction, as viewed in FIG. 1, the pin 8 will produce clockwise swinging of the control lever 7, so that the edge 7' thereof moves to the right, as viewed in FIG. 1 along the pin 11, maintaining the drive lever 10 in its rest position shown in FIG. 1 until after diaphragm has been stopped down to the preselected aperture. Thus, the edge 7' is made long enough to assure the completion of the stopping down of the diaphragm before this edge 7' is made long enough to assure the completion of the stopping down of the diaphragm before this edge 7' moves to the right, as viewed in FIG. 1, beyond the pin 11. As soon as the control lever 7 turns clockwise in FIG. 1 through an angle sufficient to displace the edge 7' beyond the pin 11, the spring 12 contracts to pull the lever 10 in a clockwise direction, thus raising the lower left end of the lever 10, as viewed in FIG. 1, toward the pin 15 of the reflector means 14. This lower left portion of the lever 10 has a pin which moves along a predetermined path into engagement with the pin 15, but there is situated along this path ahead of the pin 15 the switch element 13a which is thus engaged by the moving means formed by the drive lever 10 before this moving means displaces the reflector means 14 from its viewing position to its exposure position. The result is that before the reflector means 14 is displaced from its viewing position the switch element 13a is displaced out of engagement with the contact 13b and into engagement with the contact 13c.

As a result, a discharge circuit for the trigger capacitor 18 for preparatory light emission is closed, with simultaneous opening of the switch 24 as by an electromagnetic relay or the like which operates in properly timed relation with actuation of the shutter-releasing button, so that during the initial part of the depression of this button, before the shutter actually is tripped, a trigger pulse of high voltage will be produced by this discharging of the capacitor 18, and the trigger transformer 20 will thus act to bring about the preparatory light emission from the xenon discharge tube 21, which forms the light-source means I shown schematically in FIG. 2. The reflected light $L_1$ from the object which is to be photographed, resulting from the preparatory light emission, travels through the objective which has already been stopped down to the preselected aperture, and the reflector means 14 will reflect this preparatory light $L_1$ through the viewfinder to the photosensitive means IV located in the path of the viewfinder light. The information resulting from the detection of this preparatory light by the photosensitive means IV is stored temperorarily by the section C of the circuitry shown in FIG. 3, which serves to store the electrical signal and to handle the information derived from the detection section B in such a way that it will be available at the section D for bringing about a proper exposure during the subsequent synchronous light emission.

After the switch 13 has thus been displaced from its normal position shown in FIG. 3 to the position where the circuit is closed through the contact 13c, the moving means formed by the lever 10 will displace the reflector means 14 from its viewing position to its exposure position, the mirror 14 which forms the reflector means thus being swung upwardly in a counterclockwise direction, as viewed in FIG. 1, beyond the path of light travelling through the objective. When the reflector means 14 has been snapped up to its exposure position the shutter-operating button or plunger has been displaced through a distance sufficient to trip the shutter and start the exposure, and simultaneously, as through an electromagnetic relay of the type referred to above, the switch 19 is closed and the switch 24 is also closed, so that a synchronous light emission from the xenon discharge tube 21 is brought about with the charge from the capacitor 22 with a trigger pulse being provided from the previously charged trigger capacitor 17 which is provided for the synchronous light emission. Of course, during the previous preparatory light emission the charge of the capacitor 23 was used.

The extent of light emission from the xenon flash discharge tube 21 is controlled by the section D of the circuitry which regulates the amount of emission in accordance with an output signal which is supplied to the section D from the section C. The emission of light from the xenon discharge tube 21 is interrupted at the instant when the amount of the synchronous light emission required for a proper exposure has been reached, or the exposure time may be controlled through an electric shutter by way of the output signal for achieving an exposure which is proper for the particular conditions which the photograph is made.

When the exposure is completed all of the parts will return to their initial positions and of course when the film is transported to cock the shutter the lever 1 is again moved to the position shown in FIG. 1 for tensioning the springs 3 and 12.

With the above-described structure of the invention during approximately the first half of the displacement of the shutter-operating button or plunger toward the shutter-tripping position, the diaphragm is automatically stopped down to the preselected aperture and then the drive lever 10 operates first to actuate the preparatory light control means with the resulting substantially instantaneous storage of information required to bring about the proper exposure resulting from the subsequent snapping up of the reflector means to its exposure position with the synchronous light emission taking place upon opening of the shutter. Thus, a predetermined sequential series of operations are carried out with the mechanism shown in FIG. 1 in such a way that the operator need only depress the shutter-tripping plunger in the usual way, with all of the above operations taking place automatically during movement of the shutter-operating button to its shutter-tripping position, so that with the above-described structure no special operations are required in connection with preparatory light emission. Furthermore it is apparent that the preparatory light emission is followed immediately by the synchronous light emission, so that any error resulting from a change in the conditions due to any time lag between preparatory light emission and synchronous light emission is reliably avoided, and the synchronous light emission will always provide a proper exposure of high accuracy with the structure of the invention. Thus, with the present invention there is provided an automatic exposure regulation in a highly efficient manner making it possible to use synchronous photography of the preparatory light emission type in a highly practical manner.

What is claimed is:

1. In a single lens reflex camera, an objective, a viewfinder, reflector means having a viewing position situated behind said objective for receiving light passing therethrough from an object to be photographed and for directing an image of the object to the viewfinder, said reflector means being movable between said viewing position and an exposure position situated beyond the path of light passing through the objective, moving means coacting with said reflector means for moving the latter from said viewing position to said exposure position, light-source means for providing light to be reflected from the object back to the objective, synchronous control means operatively connected with said light-source means for energizing the latter to emit light during exposure while said reflector means is in said exposure position thereof, and preparatory control means operatively connected with said light-source means for energizing the latter to provide light prior to actual exposure, said moving means being operatively connected with said preparatory control means for actuating the latter to energize said light-source means during operating of said moving means just prior to displacement of said reflector means by said moving means from said viewing position to said exposure position thereof.

2. The combination of claim 1 and wherein said moving means has a rest position and moves along a predetermined path from said rest position into engagement with said reflector means for moving the latter from said viewing position to said exposure position thereof, said preparatory control means being situated along said path of movement ahead of said reflector means to be actuated by said moving means just prior to movement of said reflector means by said moving means from said viewing position to said exposure position.

3. The combination of claim 1, including a diaphragm-adjusting means for stopping a diaphragm down to a preselected aperture, actuating means for actuating said diaphragm-adjusting means, and motion-transmitting means for transmitting motion first to said actuating means and then to said moving means so that the diaphragm has been stopped down to said preselected aperture when said preparatory control means is actuated by said moving means just prior to displacement of said reflector means from said viewing to said exposure position thereof.

4. The combination of claim 1 and wherein said moving means has a rest position from which said moving means moves along a predetermined path into engagement with said reflector means to displace the latter from said viewing position to said exposure position, said preparatory control means being situated along the latter path ahead of said reflector means to be actuated by said moving means prior to displacement of said reflector means by said moving means from said viewing position to said exposure position, diaphragm-adjusting means for stopping a diaphragm down to a preselected aperture, actuating means coacting with said diaphragm-adjusting means for actuating the latter, and motion-transmitting means coacting with said actuating means and moving means for first operating said actuating means to stop the diaphragm down to a preselected aperture and for then transmitting motion to said moving means to displace the latter from said rest position into engagement with said reflector means, so that the diaphragm has been stopped down to a preselected aperture when said preparatory control means is actuated by said moving means.

5. The combination of claim 4 and wherein said motion-transmitting means includes a swingable power lever having a rest position engaging said actuating means and a spring urging said power lever to displace said actuating means for operating said diaphragm-adjusting means, a release lever coacting with said power lever for releasing the latter to said spring, said moving means including a drive lever movable from said rest position into engagement with said reflector means and a second spring urging said drive lever from said rest position thereof into engagement with said reflector means to displace the latter from said viewing position to said exposure position, and a control lever interposed between said power lever and drive lever for releasing the latter to said second spring only after said power lever has operated said actuating means.

6. The combination of claim 5 and wherein said control lever is swingable about a predetermined axis and has an edge extending along an arc whose center is in said axis, said drive lever having a pin urged into engagement with said edge of said control lever by said second spring, said power lever engaging said control lever for swinging the latter about said axis while operating said actuating means, and said edge being long enough to remain in engagement with said pin until said diaphragm-adjusting means have been operated, said edge then moving beyond said pin to release said drive lever to said second spring.

7. The combination of claim 6 and wherein said drive lever has a portion movable along said path into engagement with said reflector means when said edge of said control lever moves beyond said pin, and said preparatory control means including a switch situated ahead of said reflector means in the path of movement of said portion of said drive lever to be actuated by the latter just prior to engagement of said reflector means by said drive lever of said moving means.

8. The combination of claim 1 and wherein said preparatory control means is electrical and includes a switch actuated by said moving means for energizing said light-source means.

9. The combination of claim 8 and wherein said moving means includes a lever swingable about a predetermined axis and having a portion moving along a predetermined path into engagement with said reflector means for displacing the latter from said viewing position to said exposure position, said switch being located along said path ahead of said reflector means to be engaged by said portion of said lever just prior to engagement of said reflector means by said portion of said lever.

10. The combination of claim 1 and wherein said reflector means while in said viewing position thereof reflects light provided by said light-source means in response to being energized by said preparatory controls means to said viewfinder, and detector means situated in the path of viewfinder light for detecting the light resulting from energizing of said light-source means by said preparatory control means to utilize the detected light in determination of the extent of exposure during operation of said light-source means by said synchronous control means, so that the detection of the reflected light resulting from energizing of said light-source means by said preparatory control means and utilization of the detected light in the control of the extent of exposure occurs immediately prior to actual exposure.

11. The combination of claim 1 and wherein said reflector means is in the form of a swingable mirror swung by said moving means upwardly from said viewing position, where said mirror extends across the optical axis of said objective, to an exposure position where said mirror is located over said optical axis, said moving means including a lever having a portion moving along a predetermined path into engagement with said mirror for swinging the latter upwardly from said viewing position to said exposure position, and said preparatory control means including a switch located in the path of movement of said lever as the latter travels toward said mirror to be engaged by said lever prior to engagement of said mirror by said lever for bringing about energizing of said light-source means by said preparatory control means just prior to swinging of said mirror upwardly from said viewing position to said exposure position.

* * * * *